(12) United States Patent
Corsini

(10) Patent No.: US 6,238,173 B1
(45) Date of Patent: May 29, 2001

(54) APPARATUS FOR PLACING GROUPS OF PRODUCTS ON PALLETS

(75) Inventor: Giuseppe Corsini, Sasso Marconi (IT)

(73) Assignee: Cat System S.r.l., Bologna (IT)

( * ) Notice: Subject to any disclaimer, the term of this patent is extended or adjusted under 35 U.S.C. 154(b) by 0 days.

(21) Appl. No.: 09/268,167

(22) Filed: Mar. 12, 1999

(51) Int. Cl.$^7$ .................................................. B65B 35/50
(52) U.S. Cl. .................................. 414/788.1; 414/789.9; 414/799; 414/902; 414/789.5
(58) Field of Search ........................... 414/788.1, 789.9, 414/791.6, 799, 794.7, 794.8, 789.5, 793, 902, 796.9, 791.4; 294/907

(56) References Cited

U.S. PATENT DOCUMENTS

| | | |
|---|---|---|
| 3,884,363 | 5/1975 | Ajlouny . |
| 4,043,097 * | 8/1977 | Ishida et al. ............................ 53/52 |
| 4,205,934 * | 6/1980 | Pantin et al. ........................... 414/77 |
| 4,592,692 * | 6/1986 | Suizu et al. ............................ 414/70 |
| 4,787,810 | 11/1988 | Cawley et al. . |
| 4,939,891 * | 7/1990 | Podini ............................ 414/791.6 X |
| 5,102,292 * | 4/1992 | Brinker et al. ....................... 414/796 |
| 5,169,284 * | 12/1992 | Berger et al. ...................... 414/796.9 |
| 5,193,973 * | 3/1993 | Tübke ............................... 414/796.9 |
| 5,415,518 | 5/1995 | Montgomery . |
| 5,507,616 * | 4/1996 | Perobelli et al. ................... 414/789.5 |
| 5,656,005 * | 8/1997 | Cummings et al. .............. 414/902 X |
| 5,758,471 * | 6/1998 | Denley et al. ......................... 53/399 |

FOREIGN PATENT DOCUMENTS

| | | |
|---|---|---|
| 35 15 996 | 11/1986 | (DE) . |
| 40 32 134 | 4/1992 | (DE) . |
| 226076 | 6/1987 | (EP) . |
| 2560172 | 8/1985 | (FR) . |

OTHER PUBLICATIONS

"Automatisierte Palettierung in der Lebensmittelindustrie"; *Fordern und Heben*; vol. 44, No. 9; Sep., 1994; pp. 714–175).

* cited by examiner

Primary Examiner—Joseph A. Fischetti
(74) Attorney, Agent, or Firm—Fay, Sharpe, Fagan, Minnich & McKee, LLP

(57) ABSTRACT

An apparatus (1) for placing products in groups on pallets, in particular to place, according to a pre-set planar configuration, at least on a plane (15) of a pallet (7) presenting a first dimension or width (X) and a second dimension or length (Y), products with an essentially planar development, produced by a related forming machine located upstream, which the products exit collected into groups of multiple products laid one on top of the other to form stacks (3); the apparatus (1) comprises a pallet loading station (12), comprising a movable arm (10) fitted with a claw (11) for gripping at least one rank (6) of stacks (3) and with a mechanism (13, 13') for imparting motion, able to translate the gripping claw (11) between a loading station and a position on the plane of the pallet (7) suitable for defining the aforesaid desired planar configuration.

13 Claims, 8 Drawing Sheets

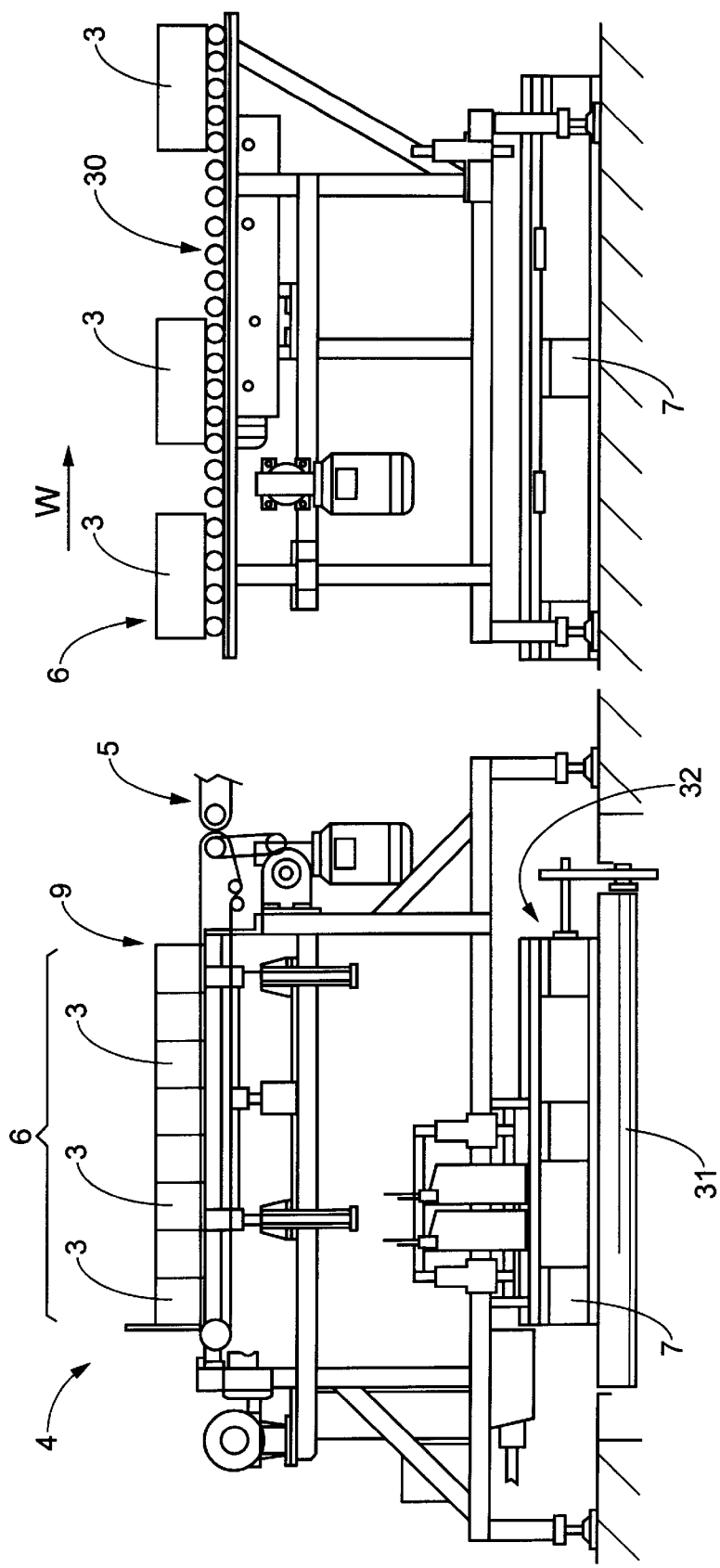

APPARATUS FOR PLACING GROUPS OF PRODUCTS ON PALLETS

BACKGROUND OF THE INVENTION

The present invention relates to an apparatus for placing groups of products on pallets. In particular, the invention can be used to perform the so-called palletisation, i.e. to arrange, on one or more pallets, groups of products stacked and placed side-by-side so as to form layers.

A non limiting example of products of this kind are pre-formed cardboard plane die-cut boards destined to provide packaging for various products such as, for instance, pharmaceuticals, cosmetics, foodstuffs and others. These plane die cut boards are called, in the technical language of the field, blanks.

One of the first phases in the production of the aforesaid packages is to group together the blanks, already fitted with notches and arriving from the machines which produce them (dinking dies), in stacks set side by side and overlaid onto related transport pallets. On each pallet is constructed a series of "planes" each defined by a number of ranks of blanks simply set side by side, whereas two successive planes are separated by intermediate cardboard sheets allowing the stacks to be supported and stabilised one on top of the other. Once a pallet is complete, its perimeter is "wrapped" with a plastic or paper film, after being clamped—if need be—with straps by means of a strapping station.

Generally, the blanks may arrive from the dinking die already arranged in stacks of a certain height and, therefore, they must be placed on the pallets and packaged for their final move. These operations are performed manually, at least until placement on the pallet, prior to wrapping with a plastic film.

From the summary description given so far, it can be noted that among the problems related to the current movement of the pallets loaded with blanks exiting dinking dies (or other die-cut or plane products to be handled in a stacked arrangement) there are some negative characteristics, which can be summed up as follows:

- lack of, or in any case insufficient control over the quality of the stacks of blanks being put out by the machines that produce them, with the resulting need to conduct a subsequent check in correspondence with the production line before they can be used;
- slow and inaccurate definition of the ranks of blanks: it is performed manually or semi-automatically by operators tasked with removing the stacks of blanks exiting the machines, requiring a relatively long time also in loading the pallets.

SUMMARY OF THE INVENTION

The Applicant has thus produced an apparatus able to handle and arrange the blanks, controlling the height of the various incoming stacks and performing a palletisation in configurations varying by number of ranks and of layers; all according to a rational, simple, economical line and with superior operating speed and safety.

BRIEF DESCRIPTION OF THE DRAWINGS

The technical characteristics of the invention, according to the aforesaid purposes, can be clearly seen from the content of the claims below and its advantages shall be made more evident in the description that follows, made with reference to the enclosed drawings, which represent an embodiment provided purely by way of non limiting example, in which:

FIGS. 4, 5 show, respectively, in a front view with removed parts and in a side view with removed parts, a portion relating to a rank forming station of the apparatus as per FIG. 1;

DESCRIPTION OF THE PREFERRED EMBODIMENTS

Figure 1:
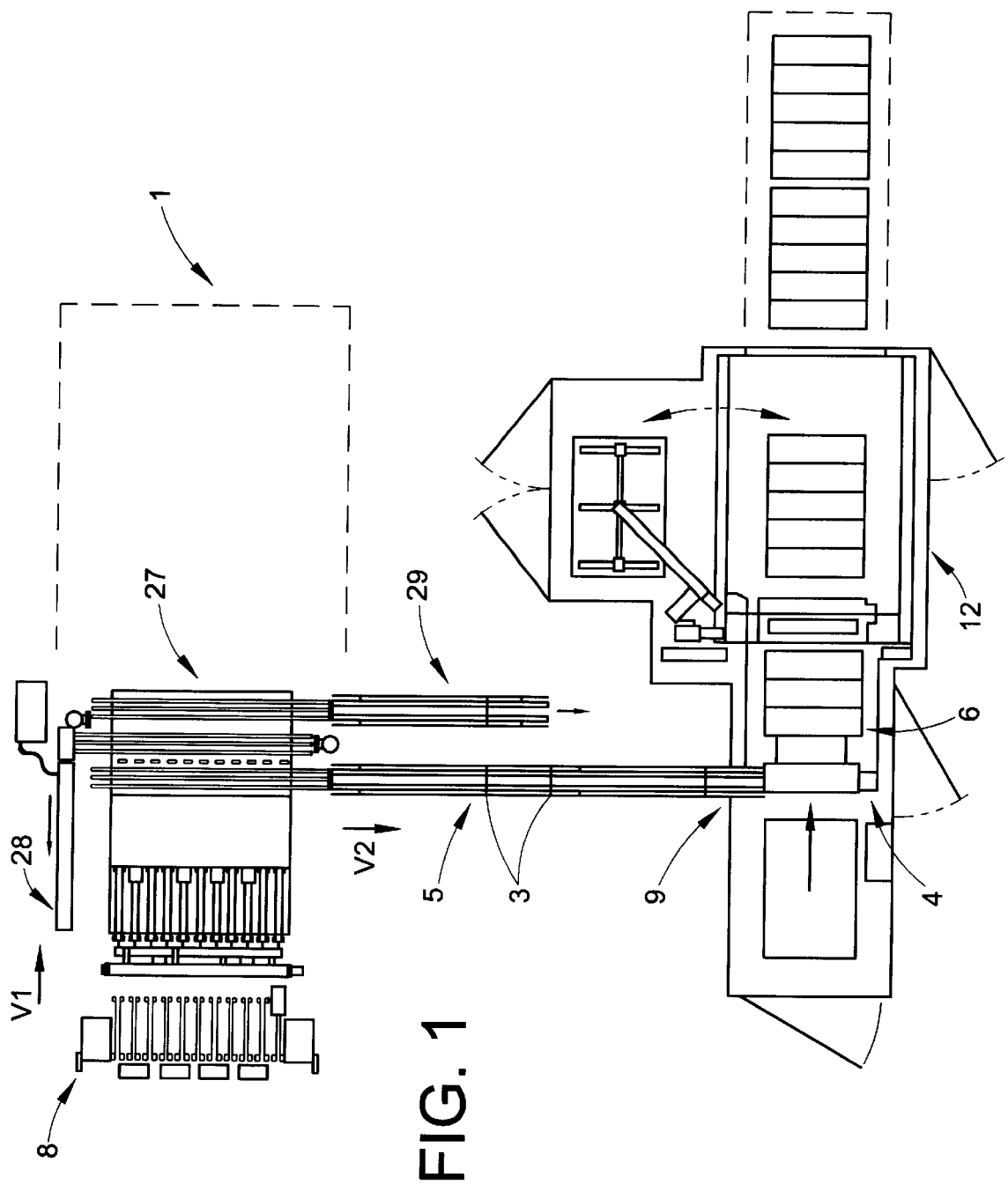
FIG. 1 shows, in an outline plan top view, a possible embodiment of an apparatus for arranging groups of products on pallets according to the present invention.

In the examples shown, an apparatus in its entirety has been indicated as 1.

As stated previously, the apparatus 1 can be used to arrange groups of products on pallets; in the present description, die-cut boards of the kind known as blanks were taken as a non limiting example of such products. The die-cut boards exit a forming machine located upstream (which may be, for instance, a dinking die and which is not shown in the drawings), and they need to be placed on pallets, according to a pre-set planar configuration, on one or more layers comprising a number of side by side ranks of the products. In practice, palletisation entails more than one layer, developed in height and separated by cardboard sheets or similar plane separating and supporting structures (also called, in the present description, planar separating elements 16). In the figures, X and Y indicate the planar dimensions of the pallet on which the product stacks 3 are to be arranged and Z indicates the related layer stacking height.

The apparatus 1, in its broader definition, can be subdivided into the following portions or operating parts, which shall be described more in detail further on: means 5 for transferring the stacks 3, a station 4 for forming ranks 6 with the stacks 3 and a pallet loading station 12. In particular, referring to the outline rendition in FIG. 1, the phases carried out by the apparatus are described hereunder.

The products arrive at an initial station 8 of the apparatus from a forming machine which supplies them already stacked so as to form stacks 3. The initial station 8 coincides, in the drawings, with a conveyor 8 which receives the products from a forming machine, not shown because it does not pertain to the present invention.

The stacks 3 are then moved, for instance with conveyor belts 5, to the station 4 forming the ranks 6, where the product stacks 3 are arranged side by side until they reach a rank height essentially equal to pallet width X.

Subsequently, in the pallet loading station 12, the ranks 6 are drawn and placed on the pallets one after the other, along length Y of the pallet 7, until a layer 15 is completed.

In the case of multi-layer pallets, suitable gripping means 14 draw separating cardboard sheets 16 and place them between the various layers 15.

Figure 2:
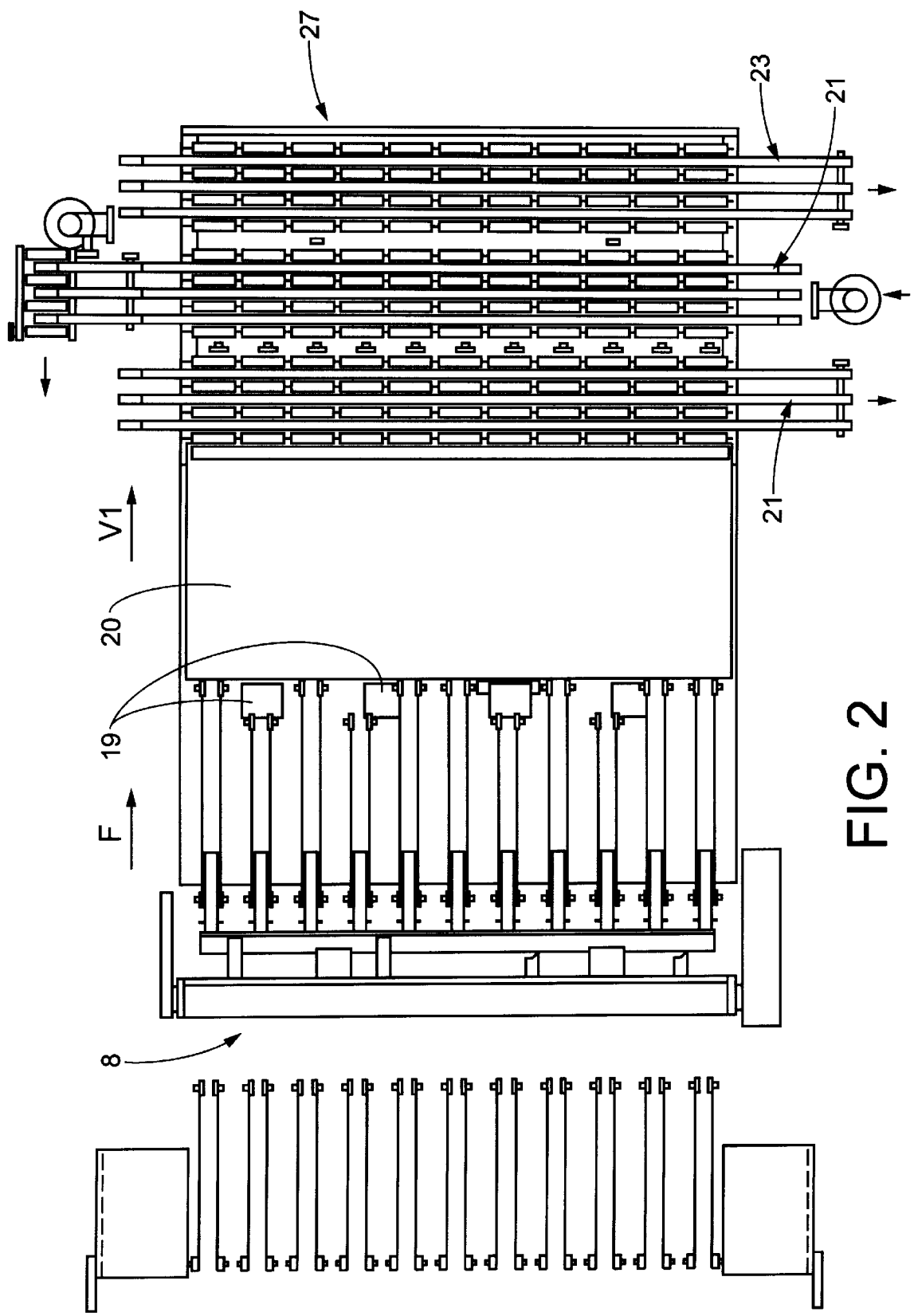
FIGS. 2, 3 show, respectively, in a top plan view and in a side view, a portion relating to an initial station of the apparatus as per FIG. 1, placed downstream of a forming machine.
Figure 3:
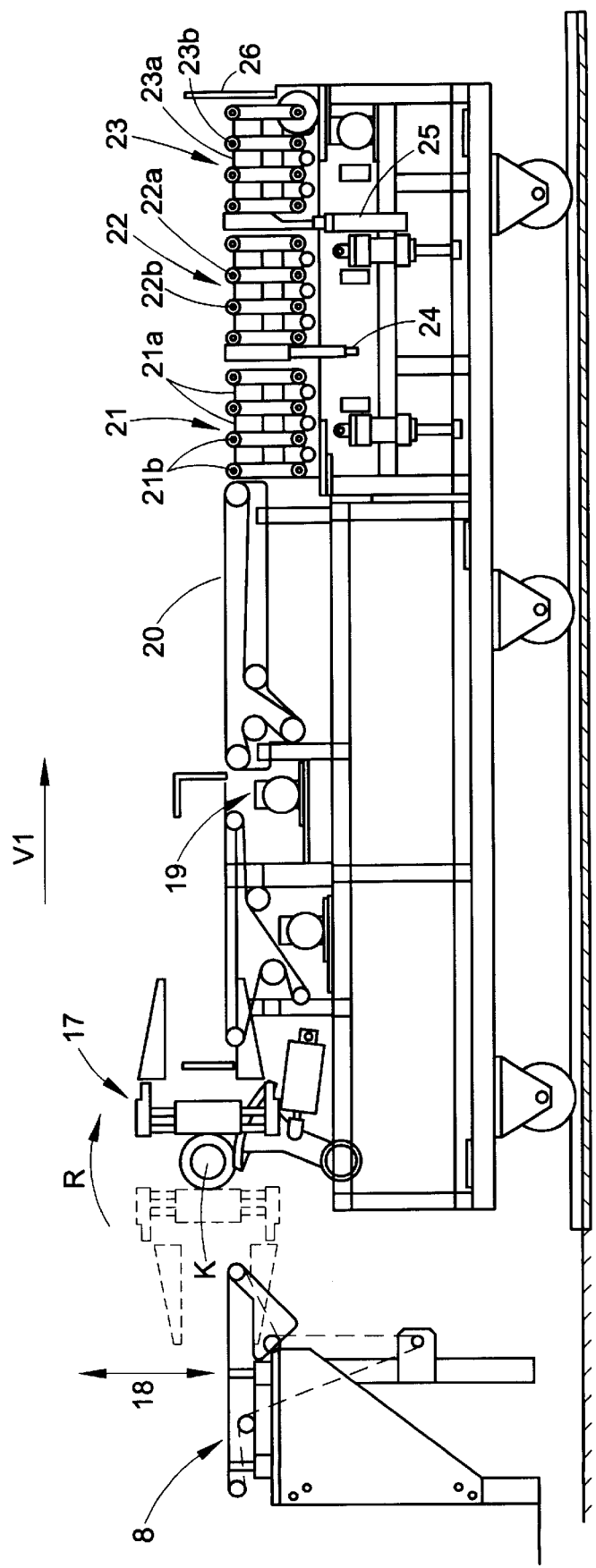
Figure 6:
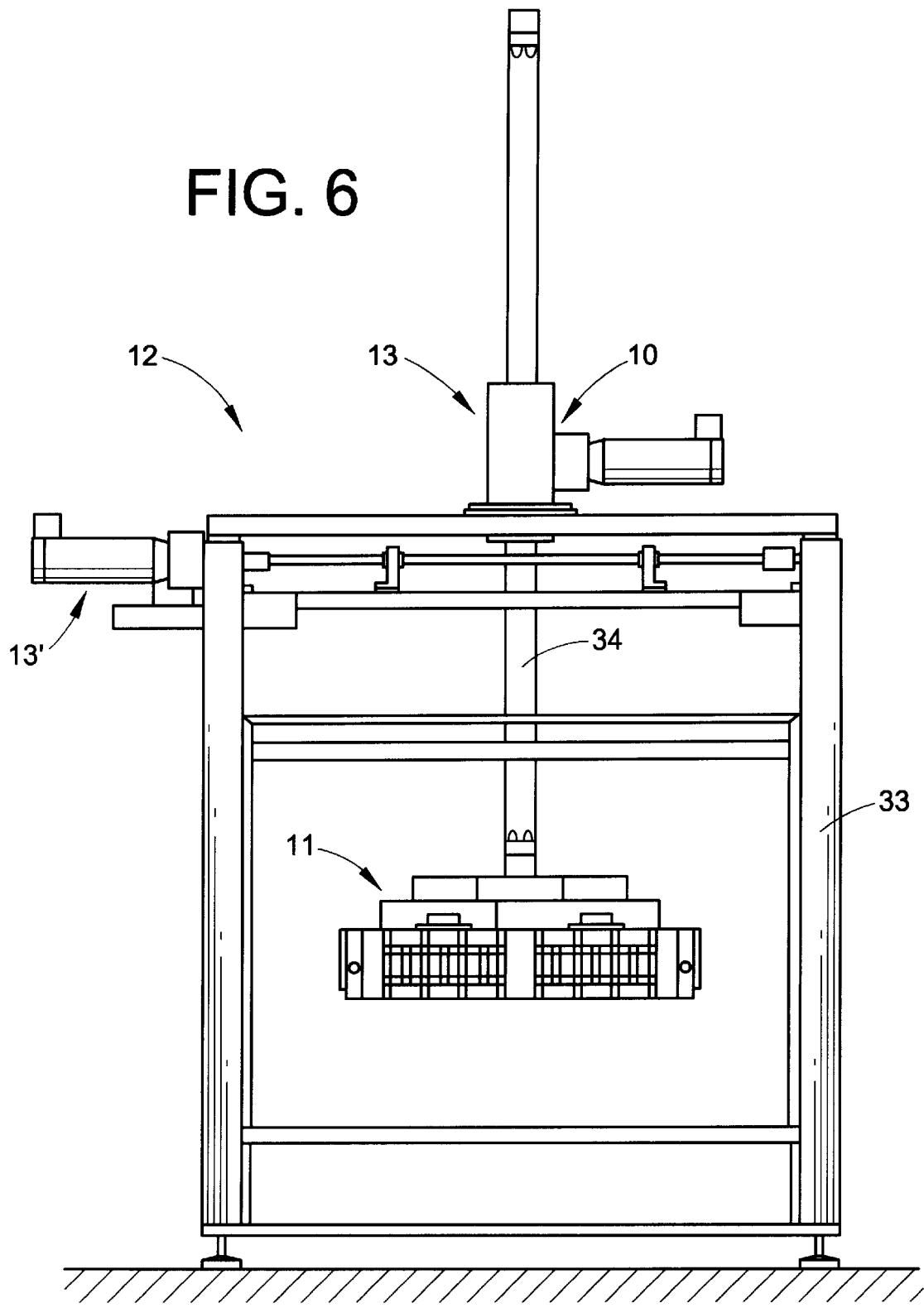
FIGS. 6, 7 show, respectively, in a front view with removed parts and in a side view with removed parts, a pallet loading station relating to the embodiment of the apparatus as per FIG. 1.
Figure 7:
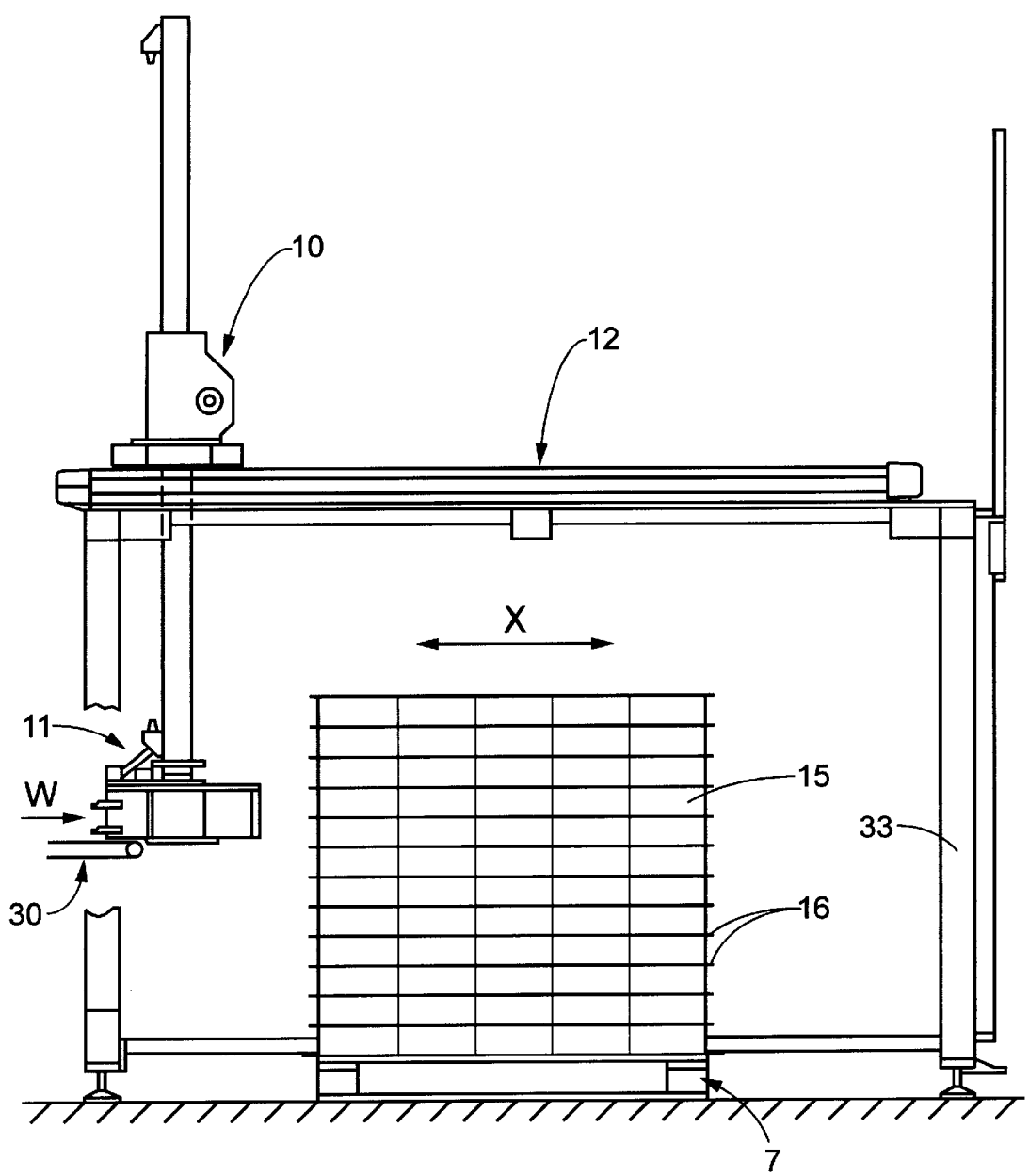

In particular, as shown more clearly in FIGS. 2 and 3, the initial station 8 is provided with means 17 for drawing the stacks 3 coming from the forming machine, able to transfer the stacks 3 downstream, towards the conveyor belt 5.

With reference to the shown example, the drawing means 17 can comprise a pincer able to grip the stacks 3 to their full height 18 and to assess, while gripping them, the actual value of that height. In particular, the pincer 17 shown in the drawings upsets the stacks 3 by performing a rotation R around a horizontal axis K; this feature is not limiting and it is determined by the way in which the forming machine supplies the products and from the configuration which the products need to assume to be transferred downstream.

Moreover, since the product stacks 3, along their movement indicated as V1 are initially kept with the larger dimension coinciding with the direction of motion, the apparatus 1 is able to orient the stacks 3 according to a pre-set direction (in this case, the direction V1). In practice, immediately downstream of the pincer means 17, there is a number of means 19 able to rotate the stacks 3, in a quantity corresponding to the requirements of the machine located upstream; in particular, in the shown example, there are four such means able to rotate, since the forming machine taken as an example supplies groups of 11 stacks arranged parallel to the direction of transfer F followed in the initial station 8 (indicated in FIG. 2), or 4 rows arranged across that direction. The rotating means may comprise platforms able to swivel at least 90°, suitably connected upstream and downstream.

Immediately downstream is fitted a conveyor 20 able to move the stacks 3 towards a stack selection area indicated in its entirety as 27. The selection area 27 is acted upon by a first 21, a second 22 and a third 23 bi-directional conveyor arranged in succession upstream to downstream and arranged parallel to each other and across conveyor 20.

The bi-directional conveyors 21, 22 and 23 comprise roller sets (respectively 21b, 22b, 23b) whose axis is transverse with respect to said conveyor 20 and between which are interposed small conveyor belts (respectively 21a, 22a, 23a) which may be placed at a lower or essentially equal height (or slightly higher) than that of the roller sets 21b, 22b and 23b. In this way the small conveyor belts 21a, 22a and 23a can assume a first (lower) disengagement position in which they do not interfere with the stacks 3 as they move along towards the subsequent conveyor belt with direction F, or a second engagement position, in which they can support and transport the incoming stacks 3, routing them as described further on.

Between the first bi-directional conveyor 21 and the second conveyor 22, as well as between the second conveyor 22 and the third conveyor 23 are fitted means (or stops) for blocking the stacks 3 in their advance in the direction F, designated respectively as 24 and 25, while outside the third belt 23 is an end board 26. The blocking means 24 and 25 may comprise vertically sliding elements which can be actuated on command, according to the operational choices made for the apparatus, similarly to what is envisioned for belts 21a, 22a and 23a.

The first bi-directional conveyor 21 is connected to the means 5 for transferring the stacks 3; the second bi-directional conveyor 22 is connected to a sample drawing line 28; the third conveyor belt 23 is connected to a scrap removal line 29.

In practice, through the pincer means 17 (the upsetting pincer in the example), the apparatus is able to determine whether a stack 3 does indeed present the characteristics prescribed for the production standard. If such characteristics are detected, the first blocking means 24 shall be activated, in order to maintain the stack on the first bi-directional conveyor 21, and to activate small conveyor belts 21a for transport toward the conveyor belt 5. If, instead, the apparatus needs to draw samples, the first blocking means 24 shall be inactive, while the second blocking means 25 shall be activated; similarly, small conveyor belts 21a shall be set to the lower position, letting the stacks 3 move along roller set 21b, making them reach the second bi-directional conveyor 22, which is connected to the sample drawing line. If deviations from the standard are detected, both blocking means (24 and 25) shall be inactive (i.e. lowered) and the stacks 3 shall thus be transported by the third bi-directional conveyor 23 to the scrap removal line 29.

As stated previously, the means 5 for transferring the stacks 3 act between the initial station 8, which is located in correspondence with the forming machine, and an arrival station 9 located downstream.

In correspondence with arrival station 9 is fitted a rank forming station 4. The rank forming station 4, better viewed in FIGS. 4 and 5, acts on the stacks 3, arriving from the belt 5 (with direction V2), arranging them into ranks 6 comprising a number of stacks 3 which can be pre-set and which corresponds in practice to the number of stacks that can be contained in one of the dimensions of the pallet 7 (in the shown example, they are rows comprising eight stacks 3, according to the dimension indicated as X).

For the formation of ranks, similarly to what is provided in selection area 27, there may be belts and roller sets able to advance a rank 6 when the programmed number of stacks 3 is reached.

Immediately downstream of the rank forming station 4 is located a roller set 30 which takes, along the direction indicated as W, the ranks 6 of stacks 3 to the pallet loading station 12.

Underneath the rank forming station 4, and also underneath the route of the final conveyor belt 30, are fitted feeding means 31 able to move the pallets to the loading station 12. Such means may comprise a motor-driven roller set 31, on which are made to advance the pallets 7, possibly guided by suitable guiding means 32 (or side walls).

The pallet loading station 12 comprises a movable arm 10 fitted with a claw 11 for gripping one of the ranks 6 of stacks 3, as well as with motion means 13 able to translate the gripping claw 11 between the end part of the forming station 4, or between the loading station defined by the ending portion of the roller set 30 and a posit-ion on a plane of the pallet 7 suitable for defining the desired planar disposition.

On the pallet loading station 12 is provided a support structure 33 on which the movable arm can slide, moved by the related motion means 13', at least along direction Y, in order to vary along that direction the point in which a rank 6 is to be deposited on the pallet 7. On the movable arm 10, i.e. on its vertical portion 34, act suitable means 13 for imparting vertical motion, able to vary the height of the gripping claw 11 between the ending portion of the roller set 30 and the height position Z where the ranks 6 are to be deposited on the pallet.

Figure 8:
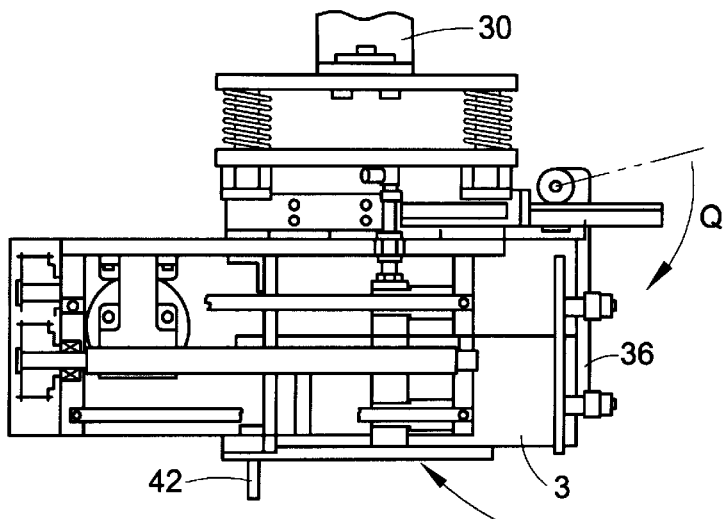
FIGS. 8, 9 show, respectively, in a side view with removed parts and in a plan view with removed parts, a detail relating to an embodiment of a movable arm usable in a loading station according to what is shown in FIGS. 6 and 7.
Figure 9:
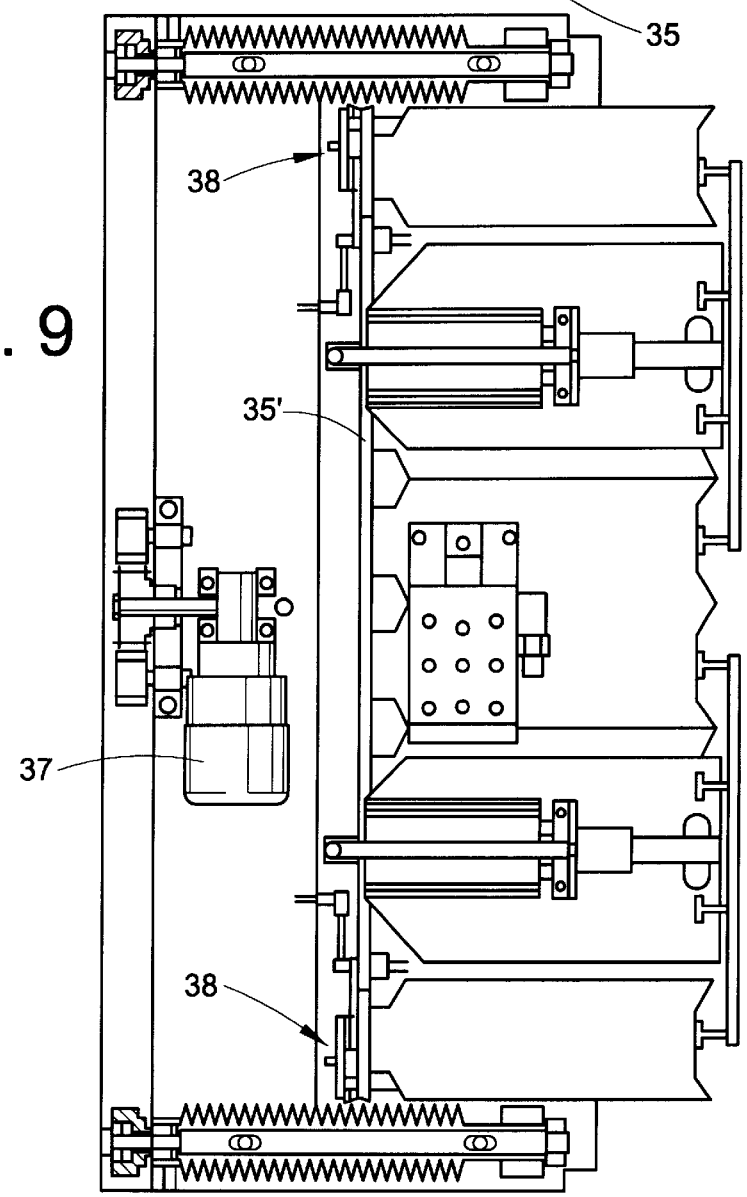

The gripping claw 11, as better viewed in FIGS. 8 and 9, may comprise a horizontal support plane element 35 or movable blade, supported by the lower end of the vertical portion 34 of the movable arm 10 and moved by a motor 37. In addition to the support plane or movable blade 35 there are also compactors 36, comprising a movable door 36 hinged at its top and suitably moved to be able to rotate, according to the direction indicated as Q, to compact the stacks 3 on the support plane 35, acting on the rear portion (according to the direction of advance W) of the blanks and pushing them against a stop 35'. The gripping claw 11 may be provided with sensors 38 able to check the presence of the stacks on the support plane 35, as well as means 42 for detecting the position of the arm with respect to the pallet 7, i.e. the interference between the support plane 35 and the plane of deposit on the pallet 7. The gripping claw 11 may also be moved (according to an example of embodiment not shown) by rotation and/or by lateral displacement according to the direction indicated as X, depending on the final configuration the pallet is to have.

Figure 10:
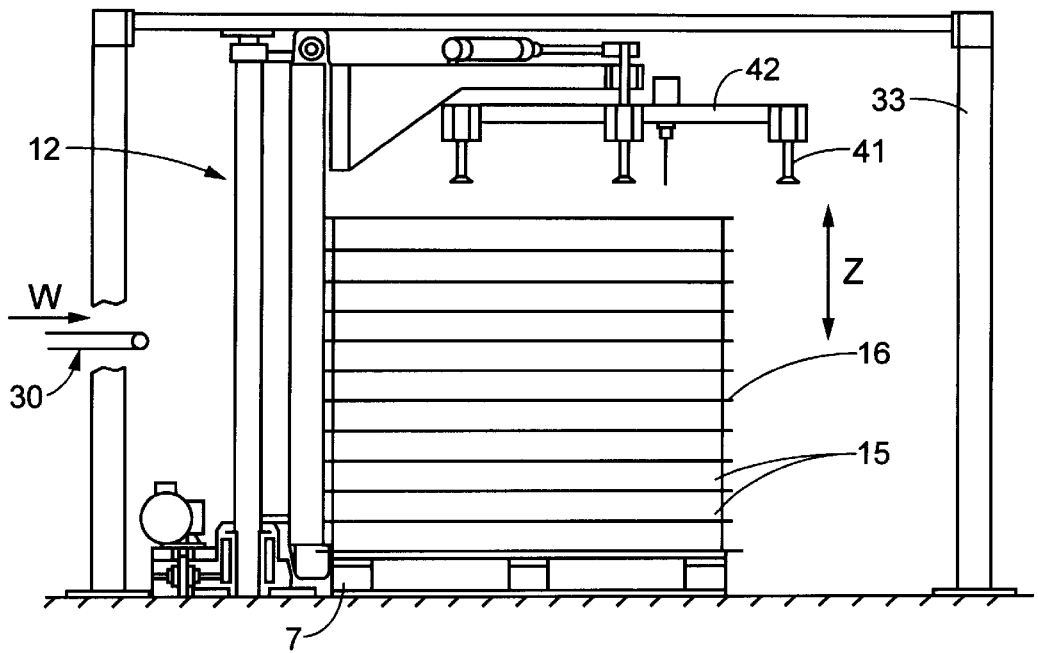
FIGS. 10, 11 show, respectively, in a side view with removed parts and in a plan view with removed parts, other details relating to the insertion of cardboard sheets between the various product layers, in the embodiment of a pallet loading station as per FIGS. 6 and 7.
Figure 11:
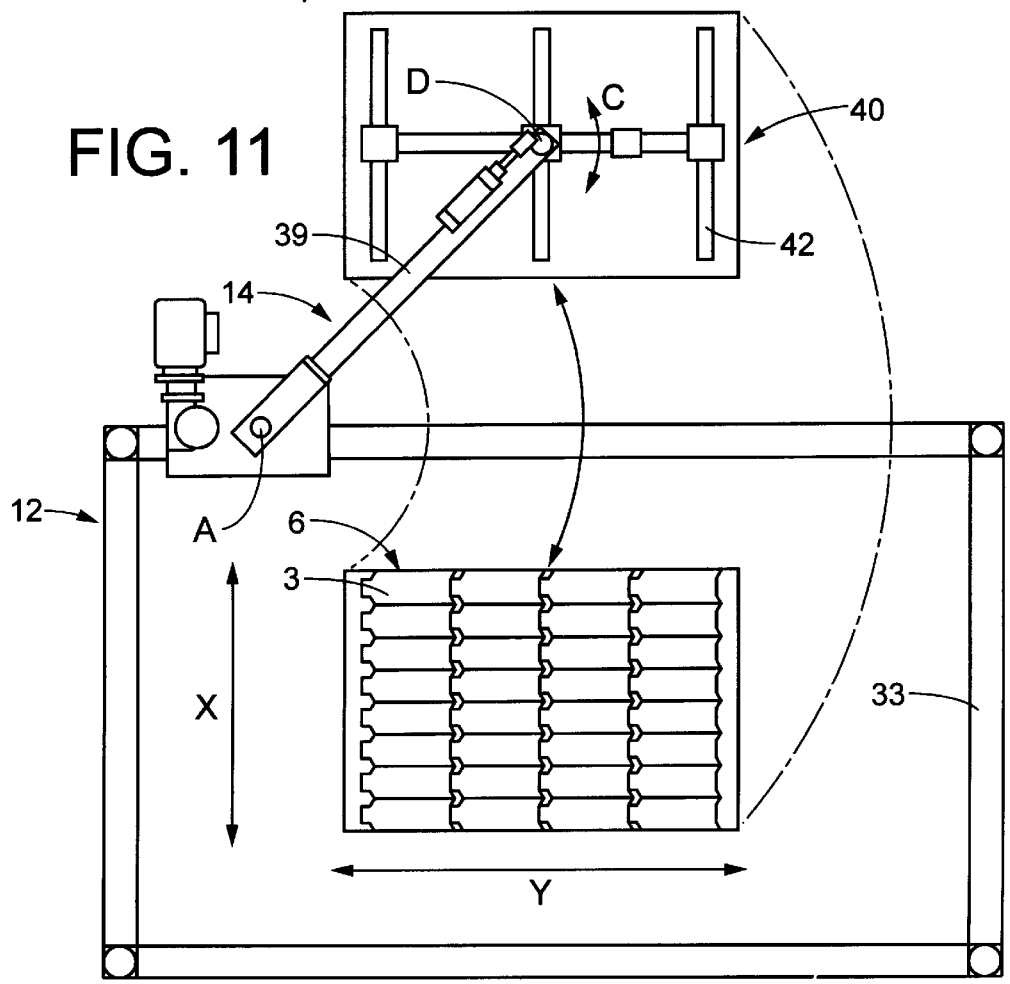

To load multiple layers, as better viewed in FIGS. 10 and 11, the apparatus may be fitted with planar separating elements 16 able to divide the different product rank layers 15.

For that purpose, to the side of the support structure 33 of the loading station 12, are provided means 14 for drawing said planar separating elements 16 or interposed cardboard sheets 16.

As in the shown example, the drawing means 14 comprise a swivelling arm 39 which may be moved, along the circular trajectory B with fulcrum in A, between at least two positions, of which one corresponds to a cardboard sheet drawing area 40, and the other one to the position for depositing on the pallet 7 inside the support structure 33.

The end of the swivelling arm 39 is connected to a frame 42 (which can swivel along a rotation trajectory C with fulcrum in D) fitted with means 41 for attaching the cardboard sheets 16, comprising, for instance, vacuum means such as suction cups 41. The swivelling arm 39, moreover, can also move in elevation, along direction Z already mentioned for movable arm 10, in such a way as to deposit cardboard sheet 16 on layers 15 positioned at different heights.

The invention thus conceived can be subject to numerous modifications and variations without thereby departing from the scope of the inventive concept. Moreover, all components may be replaced with technically equivalent elements.

What is claimed is:

1. A apparatus for placing groups of products on pallets, in particular to place, according to a pre-set planar configuration, at least on one plane (15) of a pallet (7) presenting a width (X) and a length (Y), products with an essentially planar shape, produced by a related forming machine located upstream and from which the products exit collected into groups of multiple products laid one on top of the other to form stacks (3) having side faces, said apparatus comprising:

means (5) for transferring said stacks (3), acting between an initial station (8), located in correspondence with said forming machine, and an arrival station (9) located downstream;

a rank forming station (4), located in correspondence with said arrival station (9) and acting on said stacks (3) to arrange the stacks in ranks (6) comprising a pre-settable number of stacks (3), corresponding to the number of stacks which can be contained in one of said width and length (X; Y) of a pallet (7);

a pallet loading station (12), comprising a movable arm (10) fitted with a gripping claw (11) for gripping at least one of said ranks (6) of stacks and with means to provide motion (13, 13') able to translate at least said gripping claw (11) between one of said forming station (4) and a loading station connected to the forming station (4), and a position on the plane of said pallet (7) suitable for defining said desired planar configuration, said griping claw comprising a planar support element extending horizontally and supported by said movable arm for supporting stacks thereon and a compactor located adjacent said support element and movable relative to said movable arm and having a horizontal component of movement for acting on at least one of the side faces of said stack so as to push the stack against a stop.

2. The apparatus according to claim 1, wherein said pallet loading station further comprises means for drawing (14) planar separating elements (16) and positioning said planar separating elements between two successive layers (15).

3. The apparatus according to claim 1, wherein said pallet loading station (12) further comprises a support structure (33) on which said movable arm (10) slides when acted on by said means (13') to provide motion, at least along said length (Y), so as to vary a point on which a rank (6) is deposited on pallet (7).

4. The apparatus according to claim 1, wherein said movable arm (10) is fitted with means (13) for imparting vertical motion, able to vary a height of the gripping claw (11) between said loading station (30) and a height position (Z) where said ranks (6) are to be deposited on the pallet.

5. The apparatus according to claim 1, wherein said gripping claw (11) comprises sensors (38) that check for the presence of the ranks (6) on said support plane (35).

6. The apparatus according to claim 1, wherein said movable arm (10) comprises means (42) for detecting the position of the arm itself with respect to the pallet (7).

7. The apparatus according to claim 2, wherein said drawing and positioning means (14) comprise a swivelling arm (39) including means (41) for attaching said separating elements (16) comprising vacuum means.

8. The apparatus according to claim 1, further comprising feeding means (31) for transporting pallets (7) to said loading station (12).

9. The apparatus according to claim 1, wherein said initial station (8) comprises means (17) for drawing the stacks (3) arriving from said forming machine and for transferring the stacks downstream; said drawing means (17) comprising pincer means for gripping a stack (3) in its full height (18) and for evaluating, in the course of the gripping operation, an actual value of that height, comparing it with a standard value.

10. The apparatus according to claim 1, wherein said initial station (8) comprises means (19) for rotating, when necessary, said stacks (3) so as to arrange them according to an orientation which corresponds to the direction of said transfer means (5).

11. The apparatus according to claim 1, wherein said initial station (8) comprises a stack selection station (27) having a first (21), a second (22) and a third (23) bi-directional conveyor, connected, respectively, to said transfer means (5), to a line (28) for drawing samples, and to a line (29) for removing scraps, so as to route said stacks (3) according to at least one of measurements taken and functional operations of said apparatus (1).

12. An apparatus for placing groups of products on pallets, in particular to place, according to a pre-set planar configuration, at least on one plane (15) of a pallet (7) presenting a width (X) and a length (Y), products with an essentially planar shape, produced by a related forming machine located upstream and from which the products exit collected into groups of multiple products laid one on top of the other to form stacks (3) having side faces, said apparatus comprising:

- means (5) for transferring said stacks (3), acting between an initial station (8), located in correspondence with said forming machine, and an arrival station (9) located downstream, said initial station including means (17) for drawing the stacks (3) arriving from said forming machine and for transferring the stacks downstream; said drawing means (17) comprising pincer means for gripping a stack (3) in its full height (18) and for evaluating, in the course of the gripping operation, an actual value of that height, comparing it with a standard value;
- a rank forming station (4), located in correspondence with said arrival station (9) and acting on said stacks (3) to arrange the stacks in ranks (6) comprising a pre-settable number of stacks (3), corresponding to the number of stacks which can be contained in one of said width and length (X; Y) of a pallet (7); and,
- a pallet loading station (12), comprising a movable arm (10) fitted with a claw (11) for gripping at least one of said ranks (6) of stacks and with means to provide motion (13, 13') able to translate at least said gripping claw (11) between one of said forming station (4) and a loading station connected to the forming station (4), and a position on the plane of said pallet (7) suitable for defining said desired planar configuration, said gripping claw comprising a compactor acting on at least one of the side faces of said stack so as to push the stack against a stop.

13. An apparatus for placing groups of products on pallets, in particular to place, according to a pre-set planar configuration, at least on one plane (15) of a pallet (7) presenting a width (X) and a length (Y), products with an essentially planar shape, produced by a related forming machine located upstream and from which the products exit collected into groups of multiple products laid one on top of the other to form stacks (3) having side faces, said apparatus comprising:

- means (5) for transferring said stacks (3), acting between an initial station (8), located in correspondence with said forming machine, and an arrival station (9) located downstream;
- a rank forming station (4), located in correspondence with said arrival station (9) and acting on said stacks (3) to arrange the stacks in ranks (6) comprising a pre-settable number of stacks (3), corresponding to the number of stacks which can be contained in one of said width and length (X; Y) of a pallet (7);
- a pallet loading station (12), comprising a movable arm (10) fitted with a claw (11) for gripping at least one of said ranks (6) of stacks and with means to provide motion (13, 13') able to translate at least said gripping claw (11) between one of said forming station (4) and a loading station connected to the forming station (4), and a position on the plane of said pallet (7) suitable for defining said desired planar configuration, said gripping claw comprising a compactor acting on at least one of the side faces of said stack so as to push the stack against a stop; and,
- a stack selection station (27) on said initial station having a first (21), a second (22) and a third (23) bi-directional conveyor, connected, respectively, to said transfer means (5), to a line (28) for drawing samples, and to a line (29) for removing scraps, so as to route said stacks (3) according to at least one of measurements taken and functional operations of said apparatus (1).

* * * * *